United States Patent
Zeng et al.

(10) Patent No.: US 10,894,319 B2
(45) Date of Patent: Jan. 19, 2021

(54) SERVO CONTROL METHOD AND APPARATUS AND ROBOT USING THE SAME

(71) Applicant: UBTECH ROBOTICS CORP LTD, Shenzhen (CN)

(72) Inventors: Yongping Zeng, Shenzhen (CN); Youjun Xiong, Shenzhen (CN); Zhongliang Wang, Shenzhen (CN); Dong Liu, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 16/671,164

(22) Filed: Oct. 31, 2019

(65) Prior Publication Data
US 2020/0206914 A1    Jul. 2, 2020

(30) Foreign Application Priority Data
Dec. 29, 2018   (CN) .......................... 2018 1 16363766

(51) Int. Cl.
B25J 19/00      (2006.01)
B25J 9/16       (2006.01)
B25J 9/10       (2006.01)
G05F 1/10       (2006.01)
G05B 19/414     (2006.01)

(52) U.S. Cl.
CPC ............... *B25J 9/161* (2013.01); *B25J 9/102* (2013.01); *B25J 9/1633* (2013.01); *G05F 1/10* (2013.01); *G05B 19/414* (2013.01)

(58) Field of Classification Search
CPC ........ B25J 19/0016; B25J 9/161; B25J 9/102; B25J 9/1633; G05F 1/10; G05B 19/414
See application file for complete search history.

(56) References Cited

U.S. PATENT DOCUMENTS 6,484,068 B1 * 11/2002 Yamamoto ........... B25J 19/0016
                                                   198/380

* cited by examiner

Primary Examiner — Cortez M Cook

(57) ABSTRACT

The present disclosure is provides a servo control method as well as an apparatus and a robot using the same. The method includes: obtaining a teeth force reduction multiple of a gear of a servo; creating a voltage queue based on the teeth force reduction multiple; calculating a target loading voltage corresponding to a current moment based on a voltage queue; and applying the target loading voltage on a motor of the servo, wherein the target loading voltage is for driving the motor of the servo to rotate. Through the above-mentioned method, the loading voltage can be effectively reduced when the servo is started, thereby protecting teeth of the gear of the servo and increasing the service life of the servo.

12 Claims, 6 Drawing Sheets

SERVO CONTROL METHOD AND APPARATUS AND ROBOT USING THE SAME

CROSS REFERENCE TO RELATED APPLICATIONS

This application claims priority to Chinese Patent Application No. 201811636376.6, filed Dec. 29, 2018, which is hereby incorporated by reference herein as if set forth in its entirety.

BACKGROUND

1. Technical Field

The present disclosure relates to control technology, and particularly to a servo control method as well as an apparatus and a robot using the same.

2. Description of Related Art

In general, the control of a servo adopts the classical PID (proportional integral derivative) algorithm, which obtains the loading voltage at two ends of the motor of the servo by calculating using the angle error and the gain. In the case that the servo is started, the angular error may be large, and the product of the gain and the angular error will be also large, so that a loading voltage applied on the two ends of the motor be large. Since at this time the loading voltage is very large while the starting time of the servo is very short, there will be a large acceleration, and then a large impact force will be generated to instantaneously hit the teeth of a gear of the servo and affect its years of use.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

Figure 4:
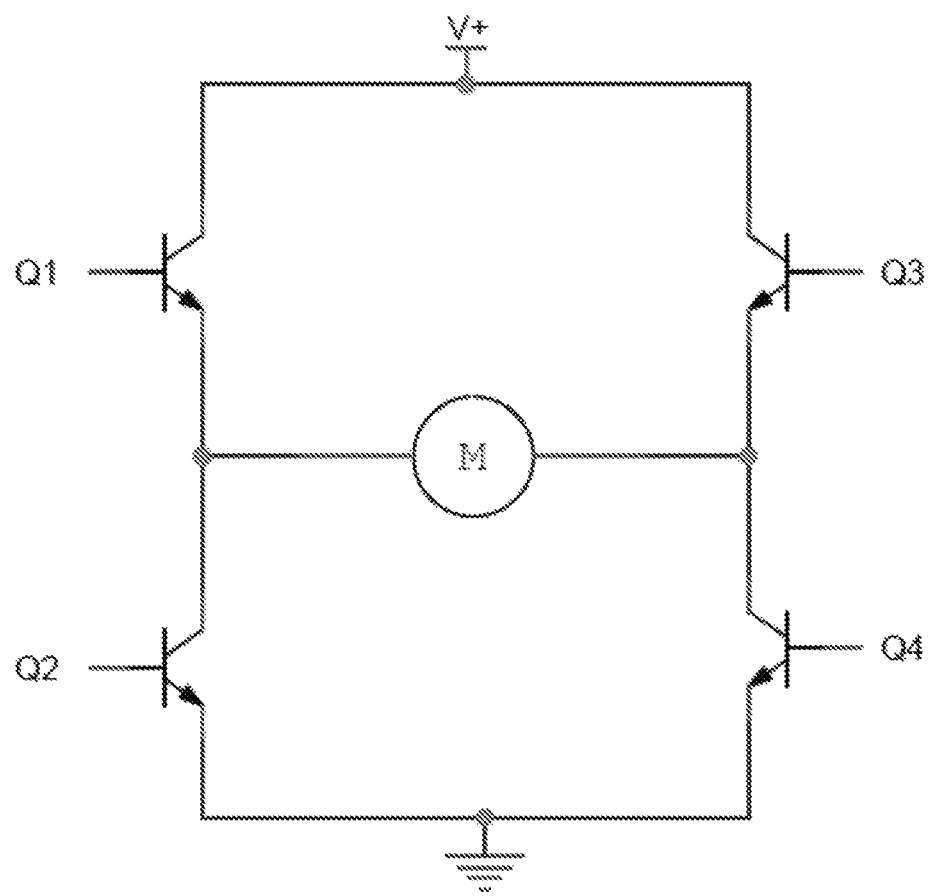
FIG. 4 is a schematic diagram of a servo M-bridge driving circuit according to an embodiment of the present disclosure.
Figure 5A:
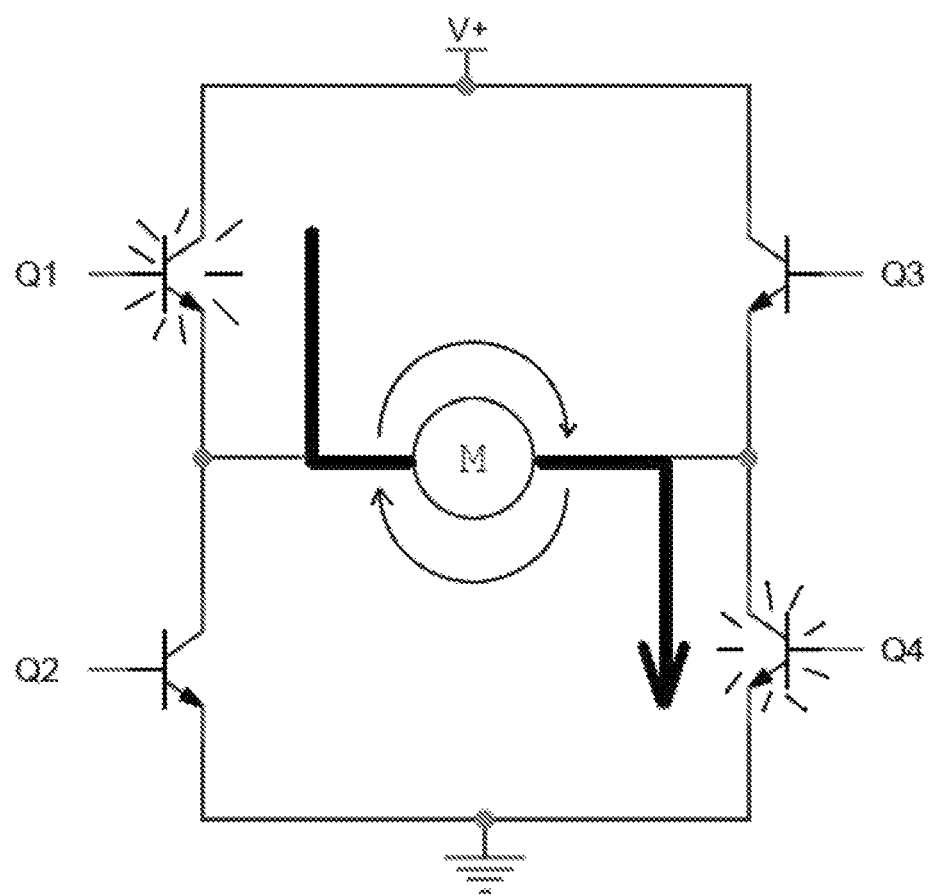
FIG. 5A is a schematic diagram of the servo U-bridge driving circuit of FIG. 4 in the case that the motor is rotated forwardly.
Figure 5B:
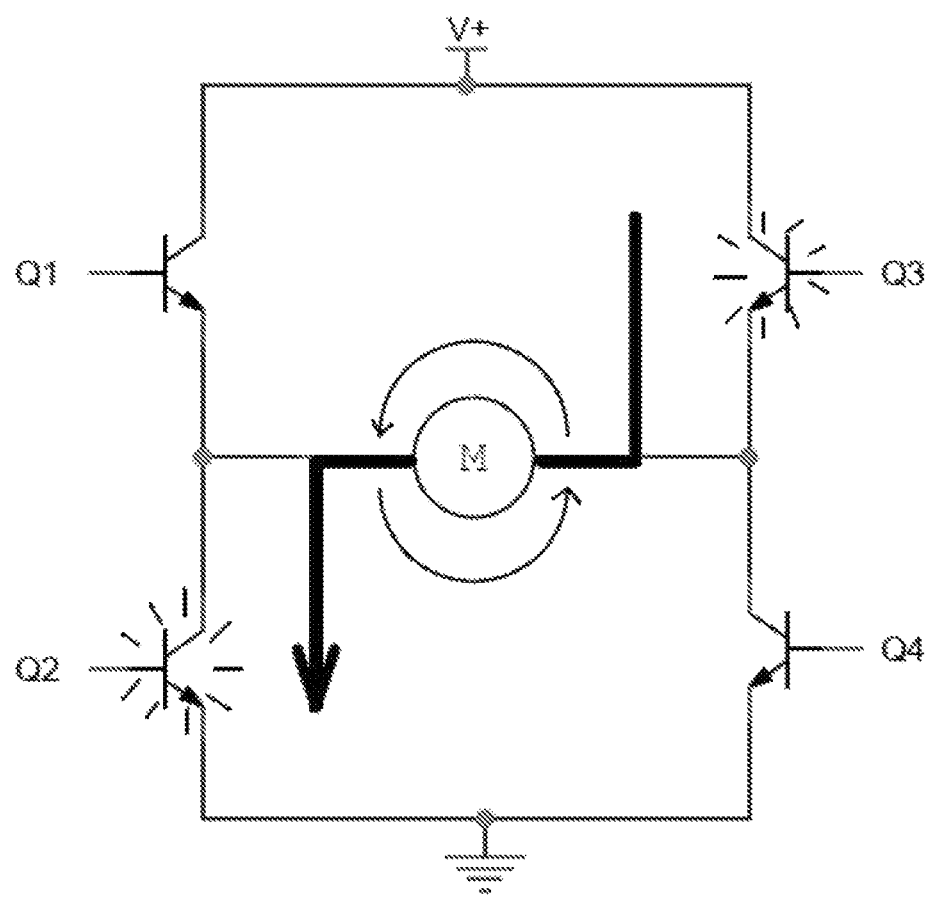
FIG. 5B is a schematic diagram of the servo H-bridge driving circuit of FIG. 4 in the case that the motor is rotated reversely.

A servo can be used as a joint of a robot so as to realize the movement of a limb (e.g., a hand, an arm, a leg, or a head) of the robot which connected to the joint. In which, the servo is driven by a motor, and the movement of the limb is realized by the motor to rotate an output shaft of the servo which is connected to the limb. FIG. 4 is a schematic diagram of a servo H-bridge driving circuit according to an embodiment of the present disclosure. As shown in FIG. 4, the motor is driven through an H-bridge. The output force of the motor depends on the voltage applied to two ends of the motor. FIG. 5A is a schematic diagram of the servo H-bridge driving circuit of FIG. 4 in the case that the motor is rotated forwardly; and FIG. 5B is a schematic diagram of the servo H-bridge driving circuit of FIG. 4 in the case that the motor is rotated reversely. As shown in FIG. 5A and FIG. 5B, transistors Q1 and Q4 are switched on during the forward rotation of the motor (see FIG. 5A), Q2 and Q3 are switched on during the reverse rotation of the motor (see FIG. 5B). In which, the switches of transistors Q1, Q2, Q3, and Q4 are controlled by PWM (pulse width modulation).

The control of the servo is realized through PID control by using a PID controller, where the relationship between the input e(t) and the output u(t) of the PID controller is:

$$u(t) = kp \times \left[ e(t) + \frac{1}{TI} \int_0^t e(t)dt + TD \times de(t)/dt \right];$$

where, kp is the gain of a proportional unit of the PID controller. TI is the gain of an integration unit of the PID controller, and TD is the gain of a differential unit of the PID controller.

u(t) is taken as the control output to be converted into a PWM duty cycle, where the magnitude of the PWM duty cycle switches the H-bridge to rotate the motor forwardly or reversely. The larger the duty cycle, the faster the speed of the motor and the larger the torque of the motor.

When the servo is just started, the error e(t) will be relatively large. When kp is fixed, the corresponding u(t) will be very large. The PWM duty ratio may be 100%, which is equivalent to applying all the bus voltage on the two ends of the motor, hence the output after the motor is started will be large. Before starting, the speed V1=0; after starting, since all the bus voltage will be applied on the two ends of the motor, the speed V2 will reach the rated speed V, and the acceleration a=dv/dt=(V2−V1)/t=V2/t=V/t. Since the starting time is very short while the speed is fixed, the acceleration will be very large at this time. The force acting on the teeth of the gear of the servo is F=ma, where m is the quality of the load of the teeth of the gear of the servo. Because the quality is fixed, the force F will be also very large. That is, when the servo is started, a large moment force will be generated. This moment force will hit the teeth of the gear of the servo, and the damage to the teeth of the gear of the servo will be very large and seriously affect its years of use.

For the purpose of describing the technical solutions of the present disclosure, the following describes through specific embodiments.

Figure 1:
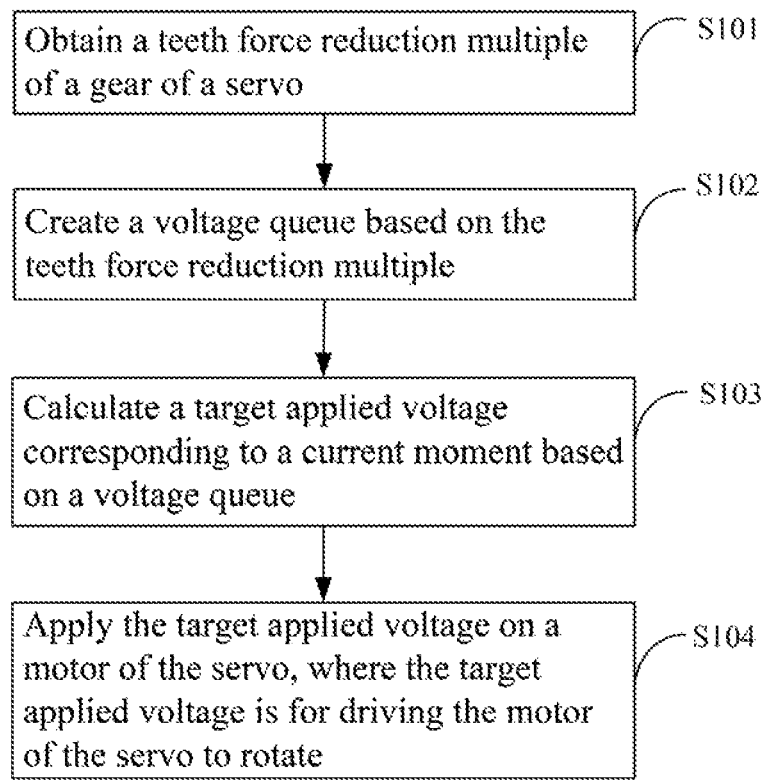
FIG. 1 is a flow chart of an embodiment of a servo control method according to the present disclosure.

FIG. 1 is a flow chart of an embodiment of a servo control method according to the present disclosure. In this embodiment, a control method for a servo of a robot is provided, which is for reducing the damage to the teeth of the gear of the servo at the time of starting. In which, the robot (e.g., a humanoid robot) has movable joints, the servos are respectively installed on each of the movable joints. The method is a computer-implemented method executable for a processor of the robot, which may be implemented through and applied to a servo control apparatus shown in FIG. 2 or a robot shown in FIG. 3, or implemented through a computer readable storage medium. As shown in FIG. 1, the method includes the following steps.

S101: obtaining a teeth force reduction multiple of a gear of the servo.

The teeth force reduction multiple (i.e., the times of the reduction of the force acting on the teeth of the gear) can be inputted by a user or be set in advance, or be obtained by deriving reversely based on an objective effect.

S102: creating a voltage queue based on the teeth force reduction multiple.

In one embodiment, e voltage queue may include:

{U1,U2, . . . ,Ui, . . . ,Un};

where, n is the teeth force reduction multiple, Ui is a preset loading voltage corresponding to the i-th moment, and i is a natural number greater than 1 and less than n.

In other words, the amount of the preset loading voltages in the voltage queue should be equal to the teeth force reduction multiple. Each preset loading voltage corresponds to each moment after the servo is started.

In one embodiment, the step of creating the voltage queue based on the teeth force reduction multiple includes:

setting an initial value of the preset loading voltage in the voltage queue corresponding to each moment to 0.

In this embodiment, initially, each preset loading voltage in the voltage queue is set to 0 first, that is, the initial voltage queue is {0, 0, . . . , 0, . . . 0}. When the servo is started, the target loading voltage is calculated in accordance with the method of step S103.

S103: calculating a target loading voltage corresponding to a current moment based on a voltage queue.

The target loading voltage is a final loading voltage calculated by the servo control method, that is, the loading voltage after the multiple reduction.

In one embodiment, the step of calculating the target loading voltage corresponding to the current moment based on the voltage queue may include:

determining whether the current moment is a first moment after the servo is started;

calculating the target loading voltage corresponding to the current moment through an equation of U1/n, in response to the current moment being the first moment after the servo is started;

obtaining actual loading voltages corresponding to each moment between a moment the servo being started and the current moment to take as historical loading voltages, in response to the current moment being not the first moment after the servo is started; and calculating the target loading voltage corresponding to the current moment based on the historical loading voltages through an equation of (U1+U2+ . . . +Uj+ . . . +Um)/n;

where, Uj equals to the actual loading voltage $U(t_j)$ corresponding to the j-th moment after the servo is started, Um equals to the actual loading voltage $U(t_m)$ corresponding to a previous moment of the current moment, and j is a natural number greater than 1 and less than m.

In one embodiment, the actual loading voltage when the servo is started has a positive ratio to the speed of the servo, hence the acceleration can be calculated by using the actual loading voltage.

Exemplarily, at the first moment when the servo is started, assumes that U1=u(t1) and the other values in the voltage queue remain as 0. At this time, the target loading voltage is (U1+U2+ . . . +Ui+ . . . +Un)/n=u(t1)/n, where the acceleration is a=(u(t1)/n)/t, and the acceleration at the actual loading voltage is a=u(t1)/t, hence the acceleration is reduced by n times; since the force F=ma, the force F is also reduced by n times.

At the third moment when the servo is started, the actual loading voltages corresponding to each moment between the moment at which the servo is started and the current moment is obtained to take as the historical loading voltages, that is, the historical loading voltages are u(t1), u(t2), and u(t3). Assumes that U1=u(t1), U2=u(t2), U3=u(t3), while other values remain as 0. At this time, the target loading voltage is (U1+U2+ . . . +Ui+ . . . +Un)/n=(u(t1)+u(t2)+u(t3)/n, and the acceleration is a=((u(t1))+u(t2)+u(t3)/n)/3t, where it can be seen that the acceleration is reduced by (n*u(t3))/(u(t1)+u(t2)+u(t3)) times; correspondingly, the force F is also reduced by (n*u(t3)/(u(t1)+u(t2)+u(t3)) times.

According to the above-mentioned example, similarly, the period during the servo is started can be divided into n parts to respectively reduce the acceleration, thereby reducing F and reduce the damage to the teeth of the gear of the servo.

S104: applying the target loading voltage on a motor of the servo, where the target loading voltage is for driving the motor of the servo to rotate.

In this embodiment, by obtaining a teeth force reduction multiple and creating a voltage queue based on the teeth force reduction multiple, the loading voltage can be adjusted more flexibly; then calculating a target loading voltage corresponding to a current moment based on a voltage queue; and applying the target loading voltage on a motor of the servo, where the target loading voltage is for driving the motor of the servo to rotate. Through the above-mentioned method, the loading voltage can be effectively reduced when the servo is started, thereby protecting teeth of the gear of the servo and increasing the service life of the servo.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 2:
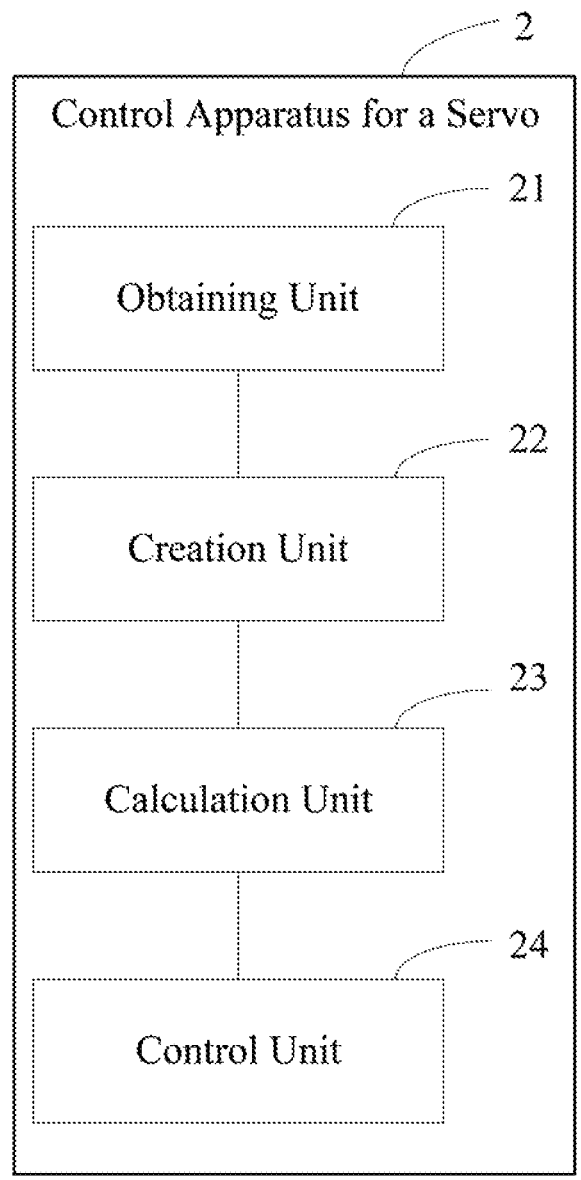
FIG. 2 is a schematic block diagram of an embodiment of a servo control apparatus according to the present disclosure.

FIG. 2 is a schematic block diagram of an embodiment of a servo control apparatus according to the present disclosure. In this embodiment, a control apparatus 2 for a servo of a robot is provided, which is for reducing the damage to the teeth of the gear of the servo at the time of starting. In which, the robot (e.g., a humanoid robot) has movable joints, the servos are respectively installed on each of the movable joints. The control apparatus may be applied to a robot shown in FIG. 3. The control apparatus corresponds to the above-mentioned servo control method of FIG. 1. For convenience of description, only parts related to this embodiment are shown. As shown in FIG. 2, the control apparatus 2 for a servo includes:

an obtaining unit 21 configured to obtain a teeth force reduction multiple of a gear of the servo;

a creation unit 22 configured to creating a voltage queue based on the teeth force reduction multiple;

a calculation unit 23 configured to calculate a target loading voltage corresponding to a current moment based on a voltage queue; and a control unit 24 configured to apply the target loading voltage on a motor of the servo, where the target loading voltage is for driving the motor of the servo to rotate.

In one embodiment, the voltage queue includes:

$\{U1,U2,\ldots,Ui,\ldots,Un\};$ where, n is the teeth force reduction multiple, Ui is a preset loading voltage corresponding to the i-th moment, and i is a natural number greater than 1 and less than n.

In one embodiment, where the creation unit 22 includes:

a setting module configured to set an initial value of the preset loading voltage in the voltage queue corresponding to each moment to 0.

In one embodiment, the calculation unit 23 includes:

a determining module configured to determine whether the current moment is a first moment after the servo is started;

a first calculation module configured to calculate the target loading voltage corresponding to the current moment through an equation of U1l/n, in response to the current moment being the first moment after the servo is started;

an obtaining module configured to obtain actual loading voltages corresponding to each moment between a moment the servo being started and the current moment to take as historical loading voltages, in response to the current moment being not the first moment after the servo is started; and a second calculation module configured to calculate the target loading voltage corresponding to the current moment based on the historical loading voltages through an equation of $(U1+U2+\ldots Uj+\ldots+Um)/n$;

where, Uj equals to the actual loading voltage $U(t_j)$ corresponding to the j-th moment after the servo is started. Urn equals to the actual loading voltage $U(t_m)$ corresponding to a previous moment of the current moment, and j is a natural number greater than 1 and less than m.

In this embodiment, each of the above-mentioned modules/units is implemented in the form of software, which can be computer program(s) stored in a memory of the control apparatus 2 and executable on a processor of the control apparatus 2. In other embodiments, each of the above-mentioned modules/units may be implemented in the form of hardware (e.g., a circuit of the control apparatus 2 which is coupled to the processor of the impedance control apparatus) or a combination of hardware and software (e.g., a circuit with a single chip microcomputer).

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all, or part of the above-mentioned functions. The functional units and modules in the embodiments may be irate rated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

Figure 3:
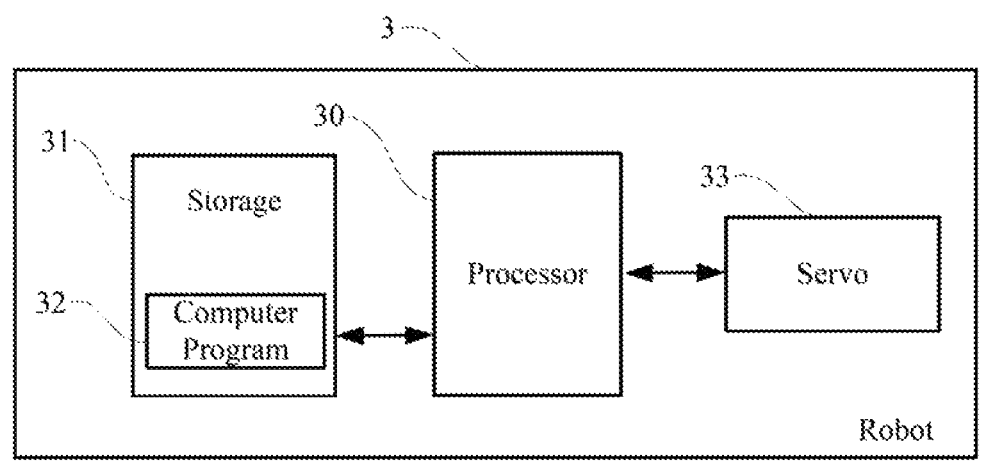
FIG. 3 is a schematic block diagram of an embodiment of a robot according to the present disclosure.

FIG. 3 is a schematic block diagram of an embodiment of a robot according to the present disclosure. As shown in FIG. 3, in this embodiment, the robot 3 includes a processor 30, a storage 31, a computer program 32 stored in the storage 31 and executable on the processor 30, and servo(s) 33. When executing (instructions in) the computer program 32, the processor 30 implements the steps in the above-mentioned embodiments of the servo control method, for example, steps S101-S104 shown in FIG. 1. Alternatively, when the processor 30 executes the (instructions in) computer program 32, the functions of each module/unit in the above-mentioned device embodiments, for example, the functions of the modules 21-24 shown in FIG. 2 are implemented.

Exemplarily, the computer program 32 may be divided into one or more modules/units, and the one or more modules/units are stored in the storage 31 and executed by the processor 30 to realize the present disclosure. The one or more modules/units may be a series of computer program instruction sections capable of performing a specific function, and the instruction sections are for describing the execution process of the computer program 32 in the robot 3. For example, the computer program 32 can be divided into an obtaining unit, a creation unit, a calculation unit, and a control unit. The function of each unit is as follows:

the obtaining unit is configured to obtain a teeth force reduction multiple of a gear of a servo;

the creation unit is configured to creating a voltage queue based on the teeth force reduction multiple;

the calculation unit is configured to calculate a target loading voltage corresponding to a current moment based on a voltage queue; and the control unit is configured to apply the target loading voltage on a motor of the servo, where the target loading voltage is for driving the motor of the servo to rotate, In one embodiment, the voltage queue includes:

$\{U1,U2,\ldots,Ui,\ldots,Un\};$ where, n is the teeth force reduction multiple, is a preset loading voltage corresponding to the i-th moment, and i is a natural number greater than 1 and less than n.

In one embodiment, where the creation unit includes:

a setting module configured to set an initial value of the preset loading voltage in the voltage queue corresponding to each moment to 0.

In one embodiment, the calculation unit includes:

a determining module configured to determine whether the current moment is a first moment after the servo is started;

a first calculation module configured to calculate the target loading voltage corresponding to the current moment through an equation of U1/n, in response to the current moment being the first moment after the servo is started;

an obtaining module configured to obtain actual loading voltages corresponding to each moment between a moment the servo being started and the current moment to take as historical loading voltages, in response to the current moment being not the first moment after the servo is started; and a second calculation module configured to calculate the target loading voltage corresponding to the current moment based on the historical loading voltages through an equation of (U1+U2+ . . . Uj+ . . . +Um)/n;

where, Uj equals to the actual loading voltage $U(t_j)$ corresponding to the j-th moment after the servo is started. Urn equals to the actual loading voltage $U(t_m)$ corresponding to a previous moment of the current moment, and j is a natural number greater than 1 and less than m.

The robot 3 may include, but is not limited to, the processor 30 and the storage 31. It can be understood by those skilled in the art that FIG. 3 is merely an example of the robot 3 and does not constitute a limitation on the robot 3, and may include more or fewer components than those shown in the figure, or a combination of some components or different components. For example, the robot 3 may further include an input/output device, a network access device, a bus, and the like.

The processor 30 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 31 may be an internal storage unit of the robot 3, for example, a hard disk or a memory of the robot 3. The storage 31 may also be an external storage device of the robot 3, for example, a plug-in hard disk, a smart media card (SMC), a secure digital (SD card, flash card, and the like, which is equipped on the robot 3. Furthermore, the storage 31 may further include both an internal storage unit, and an external storage device, of the robot 3. The storage 31 is configured to store the computer program 32 and other programs and data required by the robot 3. The storage 31 may also be used to temporarily store data that has been or will be output.

In the above-mentioned embodiments, the description of each embodiment has its focuses, and the parts which are not described or mentioned in one embodiment may refer to the related descriptions in other embodiments.

Those ordinary skilled in the art may clearly understand flat, the exemplificative units and steps described, in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments, provided by the present disclosure, it should be understood that the disclosed apparatus robot and method may be implemented in other manners. For example, the above-mentioned apparatus robot embodiment is merely exemplary. For example, the division of modules or units is merely a logical functional division, and other division manner may be used in actual implementations, that is, multiple units or components may be combined or be integrated into another system, or some of the features may be ignored or t performed. In addition, the shown or discussed, mutual coupling may be direct coupling or communication connection, and may also be indirect coupling or communication connection through some interfaces, devices or units, and may also be electrical, mechanical, or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive Or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented control method for a servo of a robot, comprising executing on a processor of the robot steps of:
    obtaining a teeth force reduction multiple of a gear of the servo;
    creating a voltage queue based on the teeth force reduction multiple;
    calculating a target loading voltage corresponding to a current moment based on the voltage queue; and
    applying the target loading voltage on a motor of the servo, wherein the target loading voltage is for driving the motor of the servo to rotate.

2. The method of claim 1, wherein the voltage queue comprises:

$$\{U1,U2,\ldots,Ui,\ldots,Un\};$$

wherein, n is the teeth force reduction multiple, Ui is a preset loading voltage corresponding to the i-th moment, and i is a natural number greater than 1 and less than n.

3. The method of claim 2, wherein the step of creating the voltage queue based on the teeth force reduction multiple comprises:
    setting an initial value of the preset loading voltage in the voltage queue corresponding to each moment to 0.

4. The method of claim 2, wherein the step of calculating the target loading voltage corresponding to the current moment based on the voltage queue comprises:
    determining whether the current moment is a first moment after the servo is started;
    calculating the target loading voltage corresponding to the current moment through an equation of U1/n, in response to the current moment being the first moment after the servo is started;
    obtaining actual loading voltages corresponding to each moment between a moment the servo being started and the current moment to tale as historical loading voltages, in response to the current moment being not the first moment after the servo is started; and
    calculating the target loading voltage corresponding to the current moment based on the historical loading voltages through an equation of (U1+U2+ ... Uj+ ... +Um)/n;
    wherein, Uj equals to the actual loading voltage $U(t_j)$ corresponding to the j-th moment after the servo is started, Um equals to the actual loading voltage $U(t_m)$ corresponding to a previous moment of the current moment, and j is a natural number greater than 1 and less than m.

5. A control apparatus for a servo of a robot, comprising;
    an obtaining unit configured to obtain a teeth force reduction multiple of a gear of the servo;
    a creation unit configured to create a voltage queue based on the teeth force reduction multiple;
    a calculation unit configured to calculate a target loading voltage corresponding to a current moment based on the voltage queue; and
    a control unit configured to apply the target loading voltage on a motor of the servo, wherein the target loading voltage is for driving the motor of the servo to rotate.

6. The apparatus of claim 5, wherein the voltage queue comprises:

$$\{U1,U2,\ldots,Ui,\ldots,Un\};$$

where, n is the teeth force reduction multiple, Ui is a preset loading voltage corresponding to the i-th moment, and i is a natural number greater than 1 and less than n.

7. The apparatus of claim 6, wherein the creation unit comprises:
    a setting module configured to set an initial value of the preset loading voltage in the voltage queue corresponding to each moment to 0.

8. The apparatus of claim 6, wherein the calculation unit comprises:
    a determining module configured to determine whether the current moment is a first moment after the servo is started;
    a first calculation module configured to calculate the target loading voltage corresponding to the current moment through an equation of U1/n, in response to the current moment being the first moment after the servo is started;
    an obtaining module configured to obtain actual loading voltages corresponding to each moment between a moment the servo being started and the current moment to take as historical loading voltages, in response to the current moment being not the first moment after the servo is started; and
    a second calculation module configured to calculate the target loading voltage corresponding to the current moment based on the historical loading voltages through an equation of (U1+U2+ ... Uj+ ... +Um)/n;
    wherein, Uj equals to the actual loading voltage $U(t_j)$ corresponding to the j-th moment after the servo is started, Um equals to the actual loading voltage $U(t_m)$ corresponding to a previous moment of the current moment, and j is a natural number greater than 1 and less than m.

9. A robot, comprising;
    at least a servo;
    a memory;
    a processor; and
    one or more computer programs stored in the memory and executable on the processor, wherein the one or more computer programs comprise:
    instructions for obtaining a teeth force reduction multiple of a gear of the servo;
    instructions for creating a voltage queue based on the teeth force reduction multiple;
    instructions for calculating a target loading voltage corresponding to a current moment based on the voltage queue; and
    instructions for applying the target loading voltage on a motor of the servo, wherein the target loading voltage is for driving the motor of the servo to rotate.

10. The robot of claim 9, wherein the voltage queue comprises:

$$\{U1,U2,\ldots,Ui,\ldots,Un\};$$

where, n is the teeth force reduction multiple, $U_i$ is a preset loading voltage corresponding to the i-th moment, and i is a natural number greater than 1 and less than n.

11. The robot of claim 10, wherein the instructions for creating the voltage queue based on the teeth force reduction multiple comprise:

instructions for setting an initial value of the preset loading voltage in the voltage queue corresponding to each moment to 0.

12. The robot of claim 10, wherein the instructions for calculating the target loading voltage corresponding to the current moment based on the voltage queue comprise:

instructions for determining whether the current moment is a first moment after the servo is started;

instructions for calculating the target loading voltage corresponding to the current moment through an equation of $U_1/n$, in response to the current moment being the first moment after the servo is started;

instructions for obtaining actual loading voltages corresponding to each moment between a moment the servo being started and the current moment to take as historical loading voltages, in response to the current moment being not the first moment after the servo is started; and instructions for calculating the target loading voltage corresponding to the current moment based on the historical loading voltages through an equation of $$(U_1+U_2+\ldots U_j+\ldots +U_m)/n;$$

wherein, $U_j$ equals to the actual loading voltage $U(t_j)$ corresponding to the j-th moment after the servo is started, $U_m$ equals to the actual loading voltage $U(t_m)$ corresponding to a previous moment of the current moment, and j is a natural number greater than 1 and less than m.

* * * * *